US008817942B2

(12) United States Patent
Cinotti

(10) Patent No.: US 8,817,942 B2
(45) Date of Patent: Aug. 26, 2014

(54) NUCLEAR REACTOR, IN PARTICULAR POOL-TYPE NUCLEAR REACTOR, WITH NEW-CONCEPT FUEL ELEMENTS

(75) Inventor: Luciano Cinotti, Recco (IT)

(73) Assignees: Del Nova Vis S.r.l., Milan (IT); Luciano Cinotti, Recco (IT)

( * ) Notice: Subject to any disclaimer, the term of this patent is extended or adjusted under 35 U.S.C. 154(b) by 443 days.

(21) Appl. No.: 12/680,055

(22) PCT Filed: Sep. 25, 2008

(86) PCT No.: PCT/IB2008/002501
§ 371 (c)(1),
(2), (4) Date: Jul. 7, 2010

(87) PCT Pub. No.: WO2009/040644
PCT Pub. Date: Apr. 2, 2009

(65) Prior Publication Data
US 2010/0290579 A1    Nov. 18, 2010

(30) Foreign Application Priority Data

Sep. 26, 2007  (IT) .............................. MI2007A1856
Apr. 24, 2008  (IT) .............................. MI2008A0766

(51) Int. Cl.
| | |
|---|---|
| G21C 1/03 | (2006.01) |
| G21C 3/32 | (2006.01) |
| G21C 19/02 | (2006.01) |
| G21C 1/00 | (2006.01) |
| G21C 3/00 | (2006.01) |
| G21C 19/00 | (2006.01) |

(52) U.S. Cl.
USPC ........... 376/404; 376/260; 376/261; 376/264; 376/327; 376/328; 376/330; 376/347; 376/361; 376/402; 376/403; 376/409; 376/426; 376/434; 376/453

(58) Field of Classification Search
CPC .............. G21C 1/02; G21C 1/03; G21C 3/02; G21C 3/04; G21C 3/30; G21C 3/32; G21C 5/02; G21C 7/30; G21C 19/02
USPC ......... 376/347, 361, 402–405, 340, 341, 366, 376/370, 373, 409, 412, 423, 260–267, 268, 376/327, 328, 330, 426, 434, 453, 454
See application file for complete search history.

(56) References Cited

U.S. PATENT DOCUMENTS

| | | | | |
|---|---|---|---|---|
| 2,743,224 | A | * | 4/1956 | Ohlinger ....................... 376/403 |
| 2,992,176 | A | * | 7/1961 | Schoessow ................... 376/403 |

(Continued)

FOREIGN PATENT DOCUMENTS

| | | |
|---|---|---|
| GB | 862208 | 3/1961 |
| GB | 1197880 | 7/1970 |

(Continued)

*Primary Examiner* — Bernarr Gregory
(74) *Attorney, Agent, or Firm* — Greenblum & Bernstein, P.L.C.

(57) ABSTRACT

The present invention relates to a nuclear reactor, in particular a pool-type nuclear reactor cooled with liquid metal (for example, a heavy metal such as lead or lead-bismuth eutectic) or with sodium or molten salts, having a core formed by a bundle of fuel elements and immersed in a primary fluid circulating between the core and at least one heat exchanger; the fuel elements extend along respective parallel longitudinal axes and have respective bottom active parts immersed in the primary fluid to constitute the core, and respective service parts that extend at the top from the active parts and emerge from the primary fluid; the fuel elements are mechanically supported via respective top end heads anchored to supporting structures and can be operated via handling machines.

39 Claims, 10 Drawing Sheets

(56) References Cited

U.S. PATENT DOCUMENTS

| | | | |
|---|---|---|---|
| 2,998,367 A * | 8/1961 | Untermyer | 376/373 |
| 3,127,325 A * | 3/1964 | Taylor et al. | 376/403 |
| 3,156,624 A * | 11/1964 | Clifford et al. | 376/341 |
| 3,177,122 A * | 4/1965 | Leonard, Jr. | 376/403 |
| 3,203,867 A * | 8/1965 | Williams et al. | 376/402 |
| 3,242,981 A * | 3/1966 | Hutchinson et al. | 376/403 |
| 3,257,285 A * | 6/1966 | Clifford et al. | 376/403 |
| 3,285,824 A * | 11/1966 | Ageron | 376/403 |
| 3,296,083 A * | 1/1967 | Haake et al. | 376/373 |
| 3,308,032 A * | 3/1967 | Berthod | 376/403 |
| 3,318,776 A * | 5/1967 | Macphee | 376/403 |
| 3,318,777 A * | 5/1967 | De Kervenoael et al. | 376/403 |
| 3,352,757 A * | 11/1967 | Dee et al. | 376/423 |
| 3,393,127 A * | 7/1968 | Detman et al. | 376/403 |
| 3,599,424 A * | 8/1971 | Yampolsky | 376/402 |
| 3,715,270 A * | 2/1973 | Jackson | 376/404 |
| 3,847,733 A * | 11/1974 | Ventre | 376/403 |
| 4,033,814 A * | 7/1977 | Bregeon et al. | 376/404 |
| 4,186,050 A * | 1/1980 | West et al. | 376/403 |
| 4,233,116 A * | 11/1980 | Mangus | 376/403 |
| 4,755,352 A * | 7/1988 | Glen et al. | 376/404 |
| 4,859,402 A * | 8/1989 | Tupper et al. | 376/402 |
| 4,968,477 A * | 11/1990 | Savinell et al. | 376/261 |
| 5,021,211 A * | 6/1991 | Hunsbedt et al. | 376/404 |

FOREIGN PATENT DOCUMENTS

| | | |
|---|---|---|
| GB | 1202920 | 8/1970 |
| GB | 1278799 | 6/1972 |
| GB | 2163888 | 3/1986 |
| WO | 2009/024854 | 2/2009 |

* cited by examiner

NUCLEAR REACTOR, IN PARTICULAR POOL-TYPE NUCLEAR REACTOR, WITH NEW-CONCEPT FUEL ELEMENTS

BACKGROUND OF THE INVENTION

1. Field of the Invention

The present invention relates to a nuclear reactor, in particular a pool-type nuclear reactor cooled with liquid metal or with sodium or with molten salts, having new-concept fuel elements.

2. Description of the Related Art

Many nuclear reactors operating with non-pressurized primary fluid have a pool configuration that includes a core formed by fuel elements, heat exchangers, and circulating pumps, in addition to a series of auxiliary systems and components necessary during normal operation of the plant or during accident situations or during refueling operations. According to known solutions, the core is positioned in the bottom part of the main tank of the reactor, immersed in the primary fluid, and is supported by a supporting grid.

The reactors according to the known solution present various drawbacks.

The core-supporting grid is in general anchored to the bottom of the tank of the reactor and is consequently not replaceable. In the case where the primary fluid is a heavy liquid metal, the fuel elements must also be equipped with a system for coupling to the grid in order to prevent floating thereof. Also the internal structure that has the mechanical function of core containment and of hydraulic separation between the hot manifold and the cold manifold is not replaceable.

In addition, usually positioned above the core are complicated structures for supporting the core control instrumentation, refueling machines comprising rotating plugs, and bars for control of the reactor. In general, there is necessary a large free space around the core for operating with the refueling machines without interfering with the structures for supporting the core control instrumentation.

Since many components are not replaceable, it is necessary to limit damage thereof caused by the neutron flow. For this purpose, each fuel element extends in length underneath the active part in such a way as to reduce damage to the supporting grid. Likewise, between the peripheral part of the core and the internal structure various shielding structures are introduced. The consequence is a significant increase in the size of the reactor.

In addition, handling of the fuel is very complicated because it requires disconnection of cables of the core control instrumentation and of the control bars actuation system to enable movement of the rotating plugs, and because machines are required to be operated within a closed and high-temperature primary system. The risk of blockage of some mechanism and of the lack of cooling of the fuel element during handling is high. Also to prevent this risk, refueling is performed only after the power of decay is sufficiently reduced, by waiting some months from extinction of the reactor or else by setting the exhausted elements to decay in lateral positions with respect to the core. In the first case, however, there is a reduction in the availability of the plant; in the second case, there is an important increase in the size of the reactor.

During operation of the core, fission gases are released by the fuel pellets, there being reserved to said gases, inside the fuel bar, a space comparable to the volume of the fuel. The consequence is a lengthening of the fuel bar, its pressurization to several tens of atmospheres, and the increase in the head losses of the core of the reactor.

SUMMARY OF THE INVENTION

An aim of the present invention is to provide a nuclear reactor that will overcome the drawbacks highlighted in the known solutions and that will present constructional advantages and advantages in terms of safety.

The present invention hence regards a nuclear reactor, in particular a pool-type nuclear reactor cooled with liquid metal, as defined in the annexed claim 1 and, for its auxiliary characteristics and plant configurations, in the dependent claims.

BRIEF DESCRIPTION OF THE DRAWINGS

The invention is described in the ensuing non-limiting example of embodiment, with reference to the figures of the annexed drawings, wherein.

DETAILED DESCRIPTION OF THE INVENTION

Figure 1:
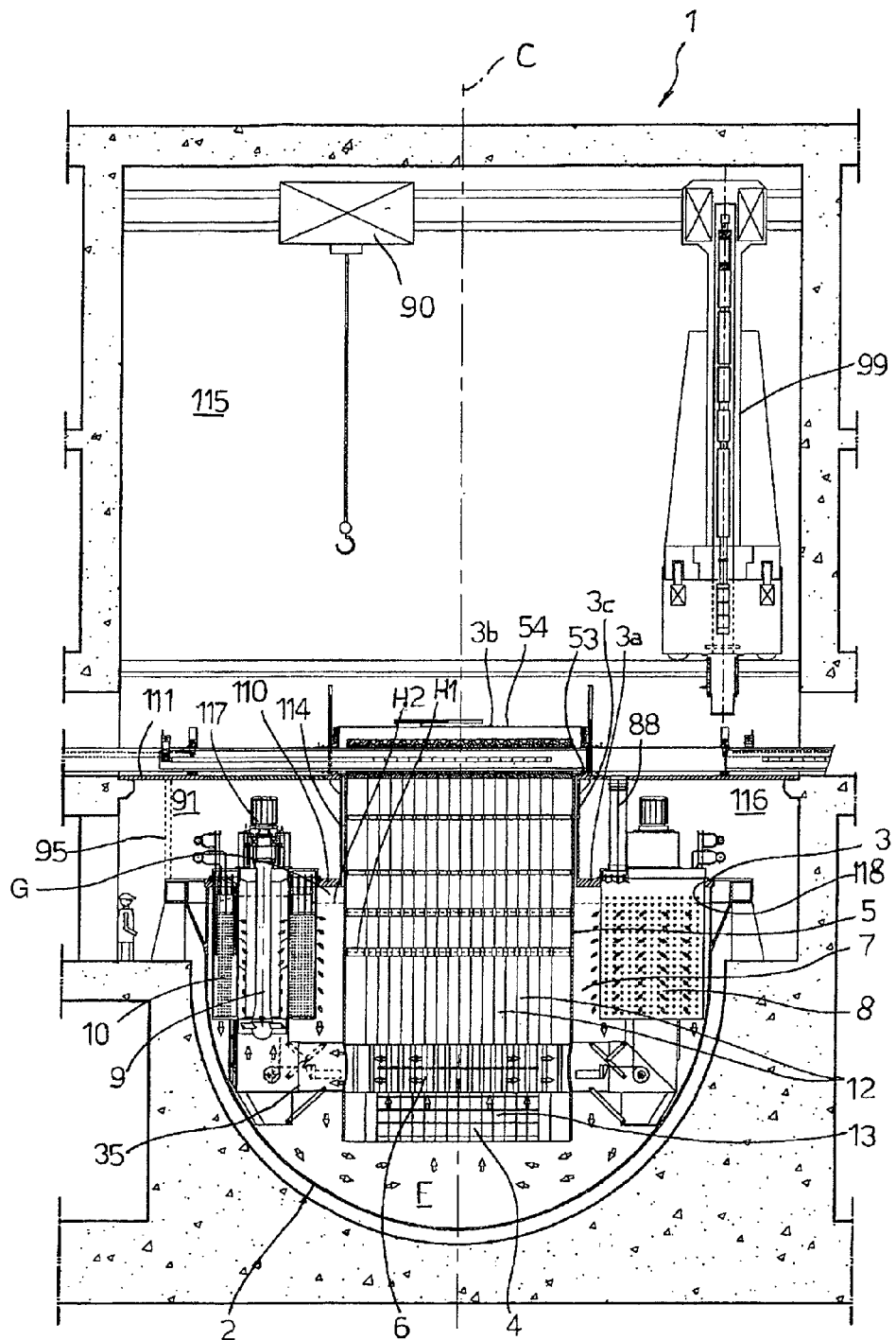
FIG. 1 is an overall schematic view in longitudinal section of a nuclear reactor in accordance with the invention.

With reference to FIG. 1, a nuclear reactor 1 comprises a main tank 2 substantially cup-shaped or pool-shaped, extending along and about a central axis C, and a multi-level closing structure 3 on a number of levels. The tank 2 contains a core 4 and a hydraulic separation structure 5, which is substantially tubular and in particular cylindrical and delimits a hot manifold 6 and a cold manifold 7, in which a primary fluid F for cooling the core 4 circulates. The hot manifold 6 is set above the core 4. The cold manifold 7 is defined between the tank 2 and the structure 5 and is consequently set around and radially external to the hot manifold 6. The primary fluid F has a free surface that in normal operation of the reactor 1 is at different levels H1, H2 in the manifolds 6, 7.

Housed within the tank 2 are functional components 8 of the reactor 1, in particular pumps 9 for circulation of the primary fluid F and primary heat exchangers 10, which are traversed by the primary fluid F and transfer to a secondary fluid circulating in an external secondary circuit (known and not illustrated) the power generated in the core 4, as well as other components (known and not illustrated) such as, for example, exchangers of the residual power. Preferably, the primary fluid F is a liquid metal and in particular a heavy liquid metal, for example lead, or a lead-bismuth eutectic. The secondary fluid is, for example, water. In the tank 2 a covering gas G is present, which covers the primary fluid F in the manifolds 6, 7.

Advantageously, the functional components 8 include pumps and primary heat exchangers as described in the WIPO patent Publication No. 2009/024854 A2, published Feb. 26, 2009, entitled "Nuclear reactor, in particular nuclear reactor cooled with liquid metal, with compact primary heat exchanger", to which the reader is referred for further details.

Figure 2:
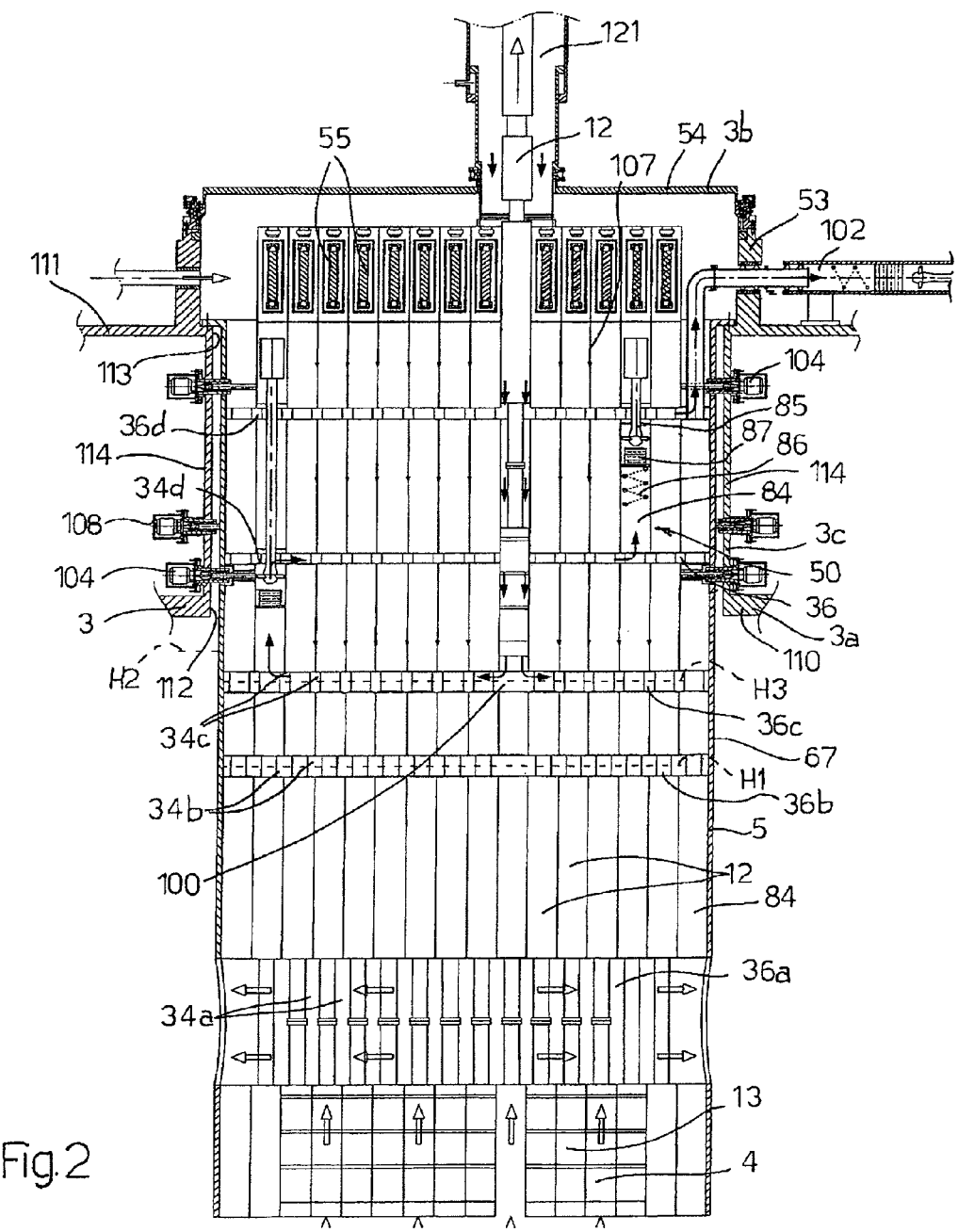
FIG. 2 is a view at an enlarged scale of a detail of the reactor of FIG. 1, representing in particular the fuel elements constituting the core of the reactor.
Figure 8:
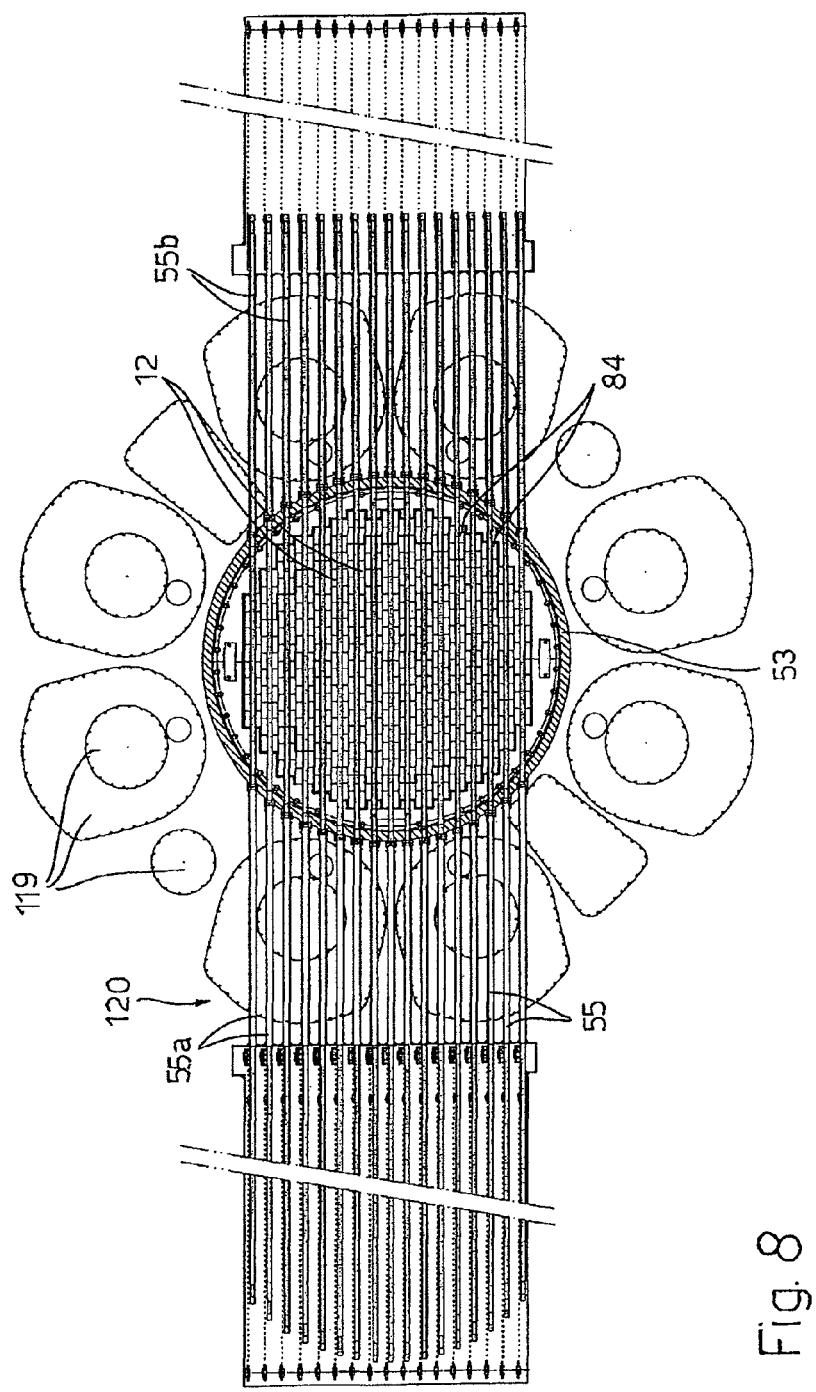
FIG. 8 is a schematic top plan view, with parts removed for reasons of clarity, of the reactor of FIG. 1.

With reference also to FIGS. 2 and 8, the closing structure 3 is a structure having a number of levels and comprises a substantially annular peripheral bottom structure 3a, set above the tank 2, a central top structure 3b, and a vertical intermediate structure 3c, which extends upwards from the bottom structure 3a connecting it to the top structure 3b and is closed at the top by the top structure 3b.

The peripheral structure 3a is constituted by an annular roof 110, which closes the tank 2 in the peripheral region and has a central opening 112. The top structure 3b is basically constituted by a plug 54, for example a rotating plug. The intermediate structure 3c comprises a closing element 111 substantially facing the roof 110 and having a central opening 113 substantially aligned to the opening 112, a tubular superelevation portion 114, which connects the opening 112 to the opening 113, and a substantially cylindrical ferrule 53.

The rotating plug 54 is supported by a thrust bearing and equipped with two sealing systems, one of which is operative when the plug is in blocked configuration (reactor in operation), and the other of which is operative when the plug is in rotating configuration (reactor undergoing refueling). The bearing and the seals are represented in the figure but are not described in so far as they are known. The closing element 111 and the structure 3c delimit, in elevation, the bottom level of a top cell 115, set above the reactor.

Located underneath the annular closing peripheral element 111 is a bottom service room 116, set on the outside and substantially around the tubular superelevation portion 114. Housed in the service room 116 are respective top heads 117 of the functional components 8 (primary exchangers, pumps for circulation of the primary fluid, exchangers of the residual power, etc.), which are positioned through windows 118 formed in the roof 110 and are arranged spaced out circumferentially around the opening 112. The closing element 111 has (FIGS. 1 and 8) trapdoors 119 aligned to respective windows 118 and through which the heads 117 of the functional components 8 are accessible from the cell 115.

Figure 3:
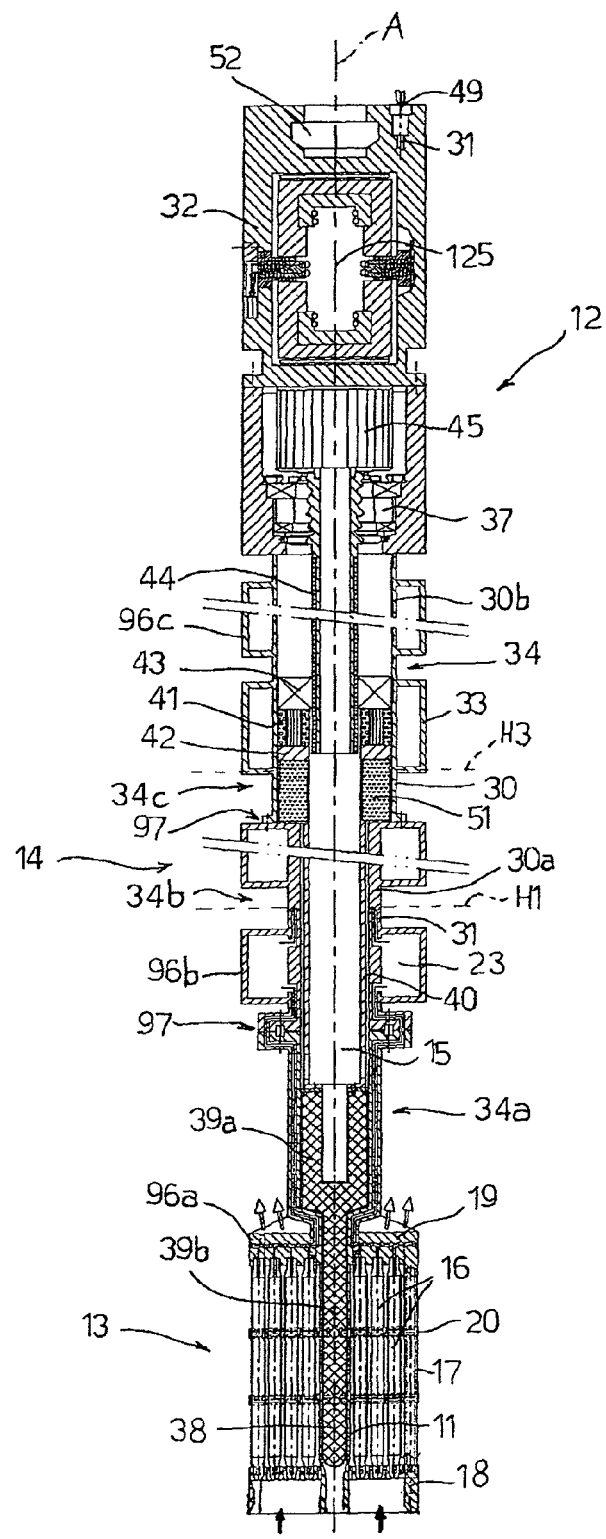
FIG. 3 is a schematic view in longitudinal section, with parts not in scale, of a fuel element.
Figure 4:
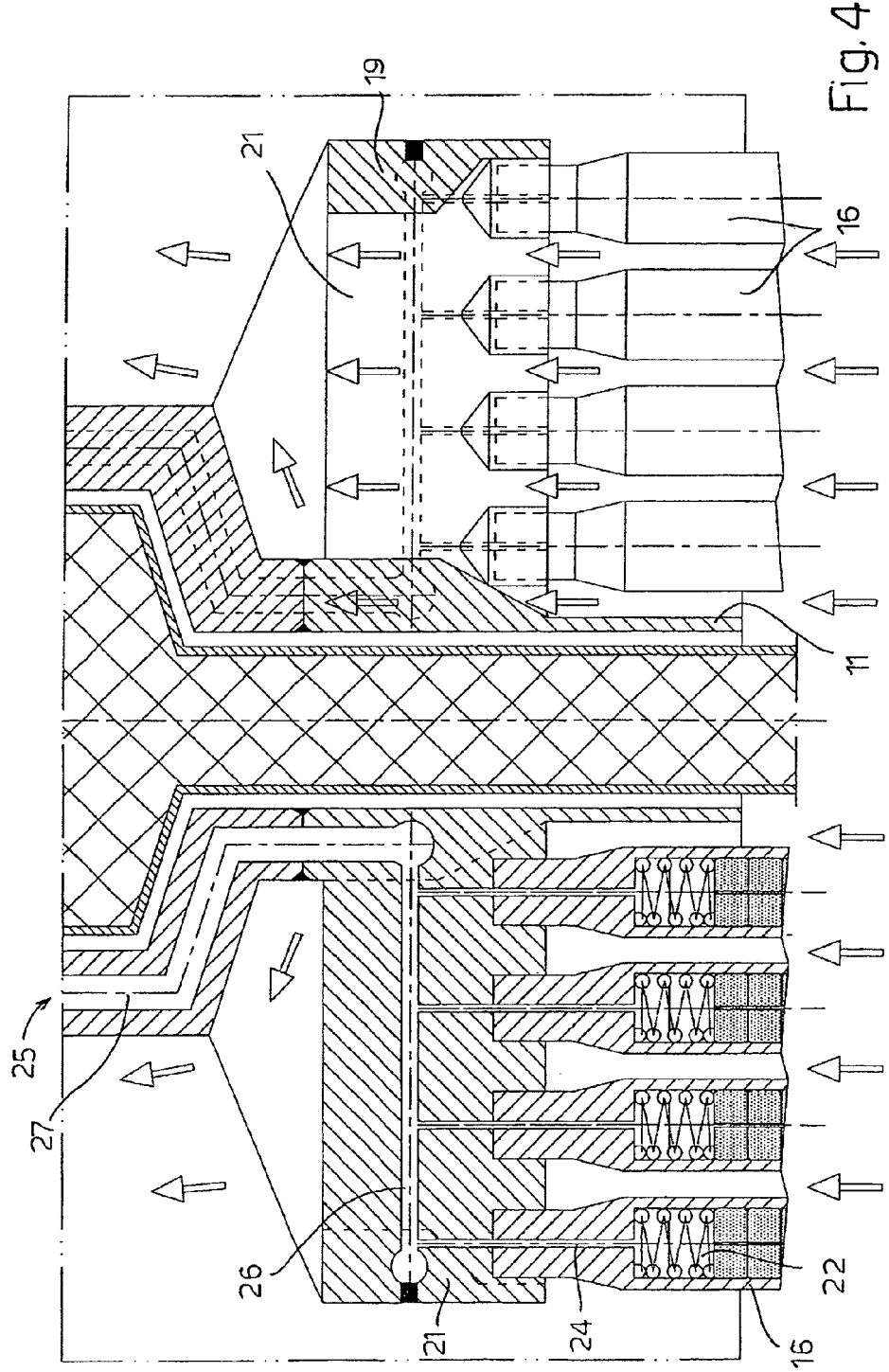
FIGS. 4 and 5 show details at an enlarged scale of the fuel element of FIG. 3.
Figure 5:
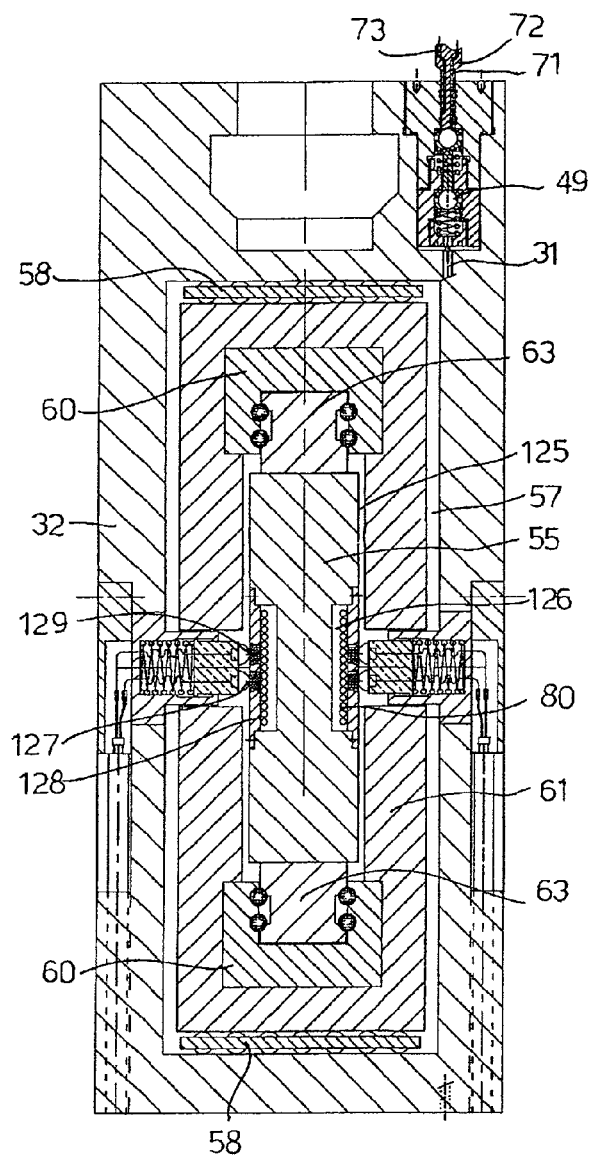

With reference also to FIGS. 3-4-5, contained within the structure 5 is a bundle of fuel elements 12, which extend along respective substantially vertical parallel longitudinal axes A and are set according to a parallel rows lattice pattern around the axis C of the reactor 1.

The elements 12 comprise respective bottom active parts 13, which constitute as a whole the core 4, and respective top service parts 14, having various functions described in what follows. Each element 12 is provided with a central longitudinal duct 15, which extends substantially throughout the entire length of the element 12. The section of the duct may be different along various functional stretches.

The active part 13 of each element 12, according to known solutions, contains a bundle of side-by-side arranged bars 16 parallel to the axis A and supported by two box structures 18, set at opposite longitudinal ends of the bars 16. The structures 18, 19, i.e. the bottom structure and the top structure respectively, have a polygonal contour, for example hexagonal or preferably square, and are open at the top and at the bottom for passage of the primary fluid F. The structures 18, 19 are connected to one another by structural tie rods 17 and by a conduit 11 that traverses the active part 13, with a cross section of a preferably square shape, which finds space thanks to removal from the lattice of some of the central bars 16. Some spacer grids 20 are positioned at different heights of the bundle of bars 16. The top structure 19 has parallel combs 21 for supporting the bars 16. The bars 16 are hollow and have internal compartments 22 that contain fissile material in the form of pellets (known and not illustrated). The bars 16 have at the top small holes 24 that connect the compartments 22 with a system 25 for recovery of the fission gases. In particular, the holes 24 are connected, via tubes 26 converging into ducts 27 for connection with the expansion space 23 housed in the service parts 14. A further duct 31, which ascends along the entire element 12, connects the expansion vessel 23 with the valves 49 that are accessible through the rotating plug 54 to make temporary pneumatic connections with controlled-pressure containers (not illustrated) set on the outside of the tank 2. The valve 49 is preferably a double-seal valve and can be connected to an auxiliary gas system (not represented) via an interface element 71 provided with a duct for discharging fission gases 72 and a flushing duct 73.

The top structure 19 connects the active part 13 of the element 12 to the top service part 14. The service part 14 comprises a central tube 30, set along the axis A and formed by a bottom portion 30a and by a top portion 30b, a top end head 32, and a perimetric structure 33 with polygonal cross section, equal to that of the structures 18, 19 (preferably square) and set externally and around the tube 30. The head 32 has the same contour (or cross section) as the structure 33.

The elements 12 are set alongside one another with the structures 33 substantially in contact with one another via respective side walls: face to face according to one directrix of the lattice and face against two half-faces according to the other directrix. The contact can be provided in pre-set points via slightly projecting hardened and ground contact plates.

The structures 33 are hollow and have respective series of local interruptions or restrictions along the axis A, which are defined by respective cross section variations set at various levels along the axis A and are set between longitudinal portions of the structure 33 to constitute respective free zones 34. The zones 34 set alongside the elements 12 communicate with one another to form free lattice spaces 36 set in horizontal layers. In each element 12, a first bottom zone 34a is set between the structure 19 and the lowest portion of the structure 33, hence immediately above the active part 13. The zones 34a constitute a space 36a of hydraulic connection between the outlet of the primary fluid F from the core 4 up to a duct 35 for delivery to the pumps 9. Further up, additional zones 34b, 34c are set at the levels H1, H3 of the free surface of the primary fluid F in the hot manifold 6 with normally operating pumps 9 and, respectively, with pumps 9 stopped. Still further up, additional zones 34d are set at a distance along the axis A to create respective stratified spaces 36 for preventing the gas G and the polluting products entrained thereby from rising.

For control of the core 4, at least some of the elements 12 are provided with absorbers 38, for controlling the nuclear reaction, which are inserted so that they can slide axially within the elements 12 and are directly moved by actuation mechanisms 37 positioned within the elements 12 themselves so as to be displaced from a resting position into a position of intervention. In particular, the core 4 comprises absorbers 38, in the form of cylinders, possibly hollow, which are inserted so that they can slide axially in guides formed within the stretch of duct 15. The absorbers 38 can be provided with an absorbent part 39a that can be brought just above the active parts 13, or else an absorbent part 39b that can traverse the active part 13 so as to be selectively introduced into the core 4 and extracted from the core 4, or else can be provided with both of the absorbent parts 39a and 39b as in FIG. 3.

In each element 12, the absorbers 38 are carried by a common mobile rod 40 along the axis A and engaged to the mechanism 37 via an electromagnet 41 and an underlying ferromagnetic anchor 42 fixed to the top end of the rod 40.

De-energization of the electromagnet 41 determines a travel of the absorbers 38 towards the core 4, by gravitational thrust of a mass 51 made of high-density material fixed with respect to the rod 40. For a slower translation of the absorbers 38, instead, as well as for their raising, the mechanism 37 comprises an internal screw 43, provided with contrast keys reacting on the portion 30b and engaged by a manoeuvring screw 44 moved by a motor 45 installed vertically in the head 32. With use in heavy liquid metal, the absorbers 38 can be inserted faster in the core if they are positioned at rest underneath the active part 13 and enter vertically from beneath upwards within said active part 13. In said variant the control rod 40 is prolonged underneath the active part 13 penetrating within the conduit 11, which also extends underneath the bottom box structure 18. In this configuration, the architecture of the control mechanisms will be adapted to the new operating modalities: in particular, the mobile actuation rod 40 along the axis A traverses the electromagnet 41 and engages the mechanism 37 via a ferromagnetic anchor 42, which, in this case, is positioned overlying the electromagnet 41. Following upon de-energization of the electromagnet 41, the absorber 38 enters the active part 13 of the core owing to the buoyant force of the heavy liquid metal.

In the reactor 1, the active parts 13 of the elements 12, constituting the core 4, are immersed in the primary fluid F, whilst the service parts 14 project at the top beyond the free surface of the primary fluid F (which in general is at the different levels H1, H2 in the manifolds 6, 7). The top part of the service portions 14 are contained in the space delimited laterally by the annular ferrules 114, 53 and at the top by the rotating plug 54. The fuel elements 12 and shielding elements 84 (described in detail in what follows) are mechanically supported by a supporting structure 120 of the core 4; the supporting structure 120 is set above the tank 2 and below the top structure 3b that overlies the elements 12, which are contained in the central area of the tank 2 and stand out with respect to the tank itself.

The supporting structure 120 comprises beams 55, which are set passing through openings made in the superelevation portion 53 and rest on supports 56 and from which there hang the elements 12, which traverse slots 125, made in the centre and arranged above the motors 45, which are designed for actuation of the absorbers 38, and underneath end seats 52, shaped in such a way as to enable engagement of each element 12 to a gripper of the handling machine.

Figure 6:
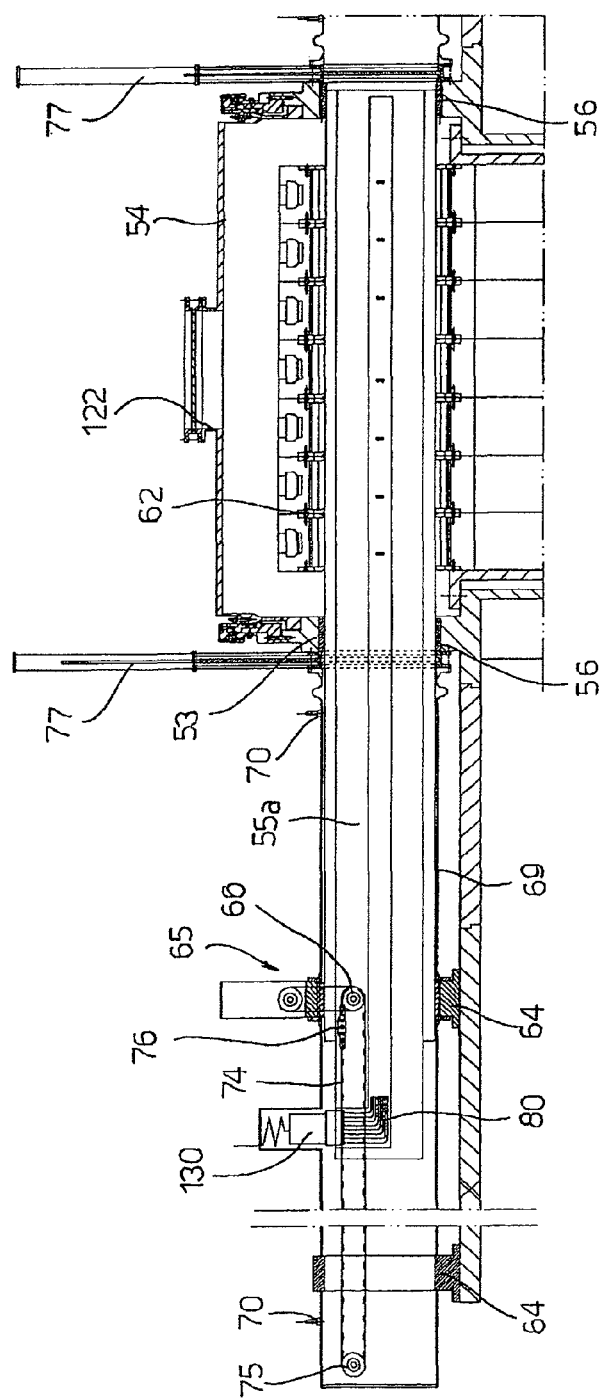
FIGS. 6-7 show respective details of the reactor of FIG. 1, regarding in particular the removable supporting system of the fuel elements.

The beams 55 are substantially rectilinear and parallel to one another and grouped together in two symmetrical series 55a, 55b. The beams 55 are complex structures, which perform various functions: mechanical support for the fuel elements 12 and the shielding elements 84, support for cables 80 for supply of the equipment for surveying the core, assistance to the refueling operations. In the configuration where the reactor is operating, only one of the two series of beams (55a or 55b) is operative whilst, in the refueling configuration, both series are operative. In the case of maintenance of the functional components 8 of the reactor 1, the series of beams overlying them can be removed either entirely or partially. FIG. 6 illustrates the configuration in which the reactor is in operation, where the series 55a of the beams is operative. The terminal stretch, reactor side, of the operative beams rests on two supports 56 made on the ferrule 53 of the vertical closing structure 3c. Along this stretch, the elements 12 hang in the central area, and the elements 84 hang in the peripheral areas. The modalities of connection enable relative axial sliding of the beam with respect to the elements 12, 84, and spacing-apart of said elements by a certain gap 57, with respect to the beam, in a direction normal to the axis of the beam itself. FIG. 5 illustrates an example of connection that responds to the functional requirements set forth above. Located on each top face and bottom face of the slot with rectangular cross section 125 is a roller track 58 with caged balls (or rollers). Located underneath the top roller track and above the bottom roller track are two sliding blocks 60 with sliding seat parallel to the axis of the beams 55. The sliding blocks 60 are installed with known modalities: fixed, for example, to one and the same sliding-block-carrying support 61 inserted on the heads 32 of the elements 12 (as indicated in FIG. 5), or else fixed directly on the heads 32, adopting according to the cases adequate side blocking devices 62. Fixed at the centre of the top and bottom faces of the beams 55 are two longitudinal guides 63 on which the sliding blocks 60 are engaged. The terminal stretch of the beams 55 inside the reactor is supported by the supports 56, which enable the beam 55 to perform only axial sliding. Consequently, the relative movement of the elements 12 and 84 with respect to the beam 55 may be either axial thanks to sliding of the ensemble beam 55/guide 63 with respect to the sliding blocks 60, or else transverse thanks to sliding of the sliding-block-carrying element 61 on the roller track 58 up to recovery of the gap 57. The beam 55 projects out of the ferrule 53 through one of the supports 56, and continues its travel guided also by further supports 64, which are located in the cell 115 and are fixed to the floor outside the overall dimensions of the exchangers. Starting from the configuration in which the pair of facing beams 55a and 55b have their opposed ends in contact with one another on one of the supports 56, the beams 55a and 55b can be slid simultaneously until the corresponding ends are brought into contact on the support 56 opposite to the starting support. By so doing, support of the elements 12 and 84 is transferred from the beam 55a to the beam 55b. Sliding of each beam is obtained by actuators 65, which, in the example represented, operate via a chain system constituted as follows: a toothed pinion wheel 66 draws an endless chain 74 closed in a loop on a return sprocket wheel 75 and with the ends 76 fixed to the beam 55 on the part external to the reactor. On the outside of the ferrule 53, in a position corresponding to traversal of the beams 55, slide valves 77 are installed. The valves 77 are open when the beams 55 are present and are closed when the latter are slid out. In their closed position, the valves 77 ensure sealing between the reactor 1 and the cell 115 in the absence of beams. Sealing between the reactor 1 and the cell 115 in the presence of the beam is obtained with different sheath modules 69, which envelop the beam, and with supports 64, which also envelop the beam. Each sheath module 69 connects in a sealed way the opposed faces of two consecutive supports and can be removed when it is not traversed by the beam. The first sheath module 69 is connected to the first support 64 on one side and to the slide valve 77 on the other.

With the beam 55 in the retracted end-of-travel position on the outside the reactor, both the support 56 and the first support 64 external to the reactor are free from the beam. Consequently, the valve 77 can be closed, and the first sheath module 69 can be removed after prior flushing obtained by blowing gas introduced and extracted through the pipe fittings 70. Removal of a number of parallel sheath modules frees the area overlying the functional components 8 of the reactor 1, and consequently said components can be removed from the reactor 1 or inserted therein.

During the refueling operation, the element 12 or 84 to be replaced is first anchored to the charging and discharging machine, which has access through openings 122 set on the rotating plug 54, and is then released from both of the beams 55, which positioned in such a way that the respective beams 55a and 55b support, respectively, the elements set on opposite sides with respect to the element to be replaced.

Figure 12:
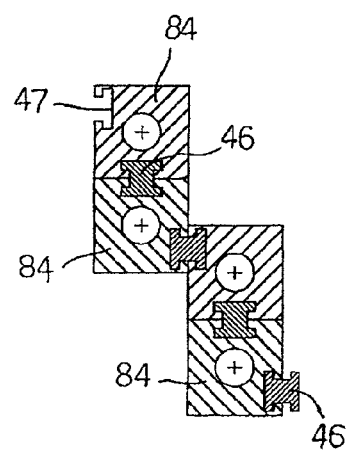
Figure 13:
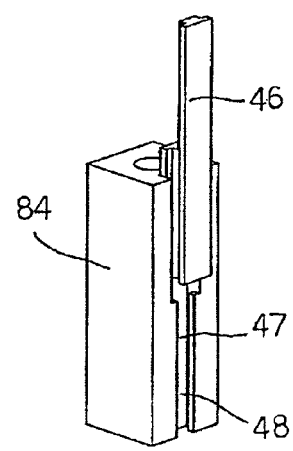
Figure 14:
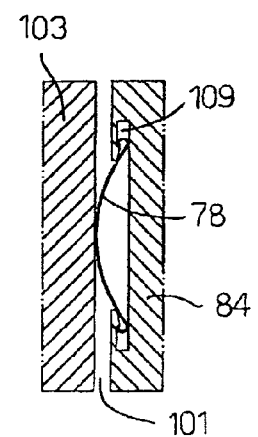

With reference to FIG. 8, the bundle of elements 12 is surrounded by shielding elements 84 set radially outside all around the bundle of elements 12. Each element 84 has a general shape substantially similar to that of the elements 12, comprising in particular a head and a perimetric structure that are the same, as regards shape and dimensions, as the heads 32 and the structures 33 of the elements 12, but do not contain fissile material, given that they have the main function of shielding the activity of the active parts 13. A number of rings of elements 84 can be provided around the bundle of elements 12. With reference to FIGS. 12-13 the ring of elements 84 also performs the function of binding the core 4 in the event of special maintenance operations. For this purpose, the elements 84 are joined to one another via releasable connection members 46, 47 to form a continuous ring closed in a loop that binds the bundle of elements 12. For example, the elements 84 are joined to one another via sectional elements 46 having the shape of a double T, which fit into pairs of specular grooves 47 set on side faces of the structures 33 of facing elements 84. Each element 84 has grooves 47 on two contiguous side faces or else on two opposite side faces. The grooves 47 of adjacent elements 84 have slotting stretches 48, which are engaged by the sectional elements 46 and have a limited length in such a way as to enable separation of the elements 84 with a partial raising of the sectional element 46 and a subsequent slight horizontal recession of one element 84 with respect to the other. The sectional element 46 will remain in any case fixed with respect to the other element 84. Binding of the elements 84 can be performed at a number of levels, with sectional elements 46 that extend throughout the necessary length, traversing also the stratified spaces 36. The operations of binding/unbinding can be performed via a remote manipulator (known and not illustrated), which acts on the tops of the sectional elements 46.

The elements 84 are enclosed and encircled by the structure 5. The structure 5 envelops the bundle of elements 12 (and the ring of elements 84) to define at the same time a structure for containment and encircling of the elements 12. The structure 5 can be made of a single tubular piece or else (as in the example illustrated) comprise a plurality of sectors 67 (for example four), which are arched and are set alongside one another circumferentially. The sectors 67 are bound in twos with the longitudinal sectional elements 92 that engage in two opposed specular grooves 93 of the longitudinal ends in contact of the sectors 67. The longitudinal contact surfaces are stepped to favour introduction and extraction. The bottom ends 98 of the contact surfaces are inclined so as to provide a wedge effect aimed at setting up against one another and/or force against one another the adjacent sectors preventing angles that might lead to self-binding.

When the sectional elements 92 are extracted, the sectors 67 are released, which, by being replaced one by one, enable change of the entire structure 5 without having to remove the fuel elements, which, during operation, may be held in a vertical position via the beams 55 resting on the supports 56 on the side of the reactor opposite to that of the sector 67 being replaced.

Figure 9:
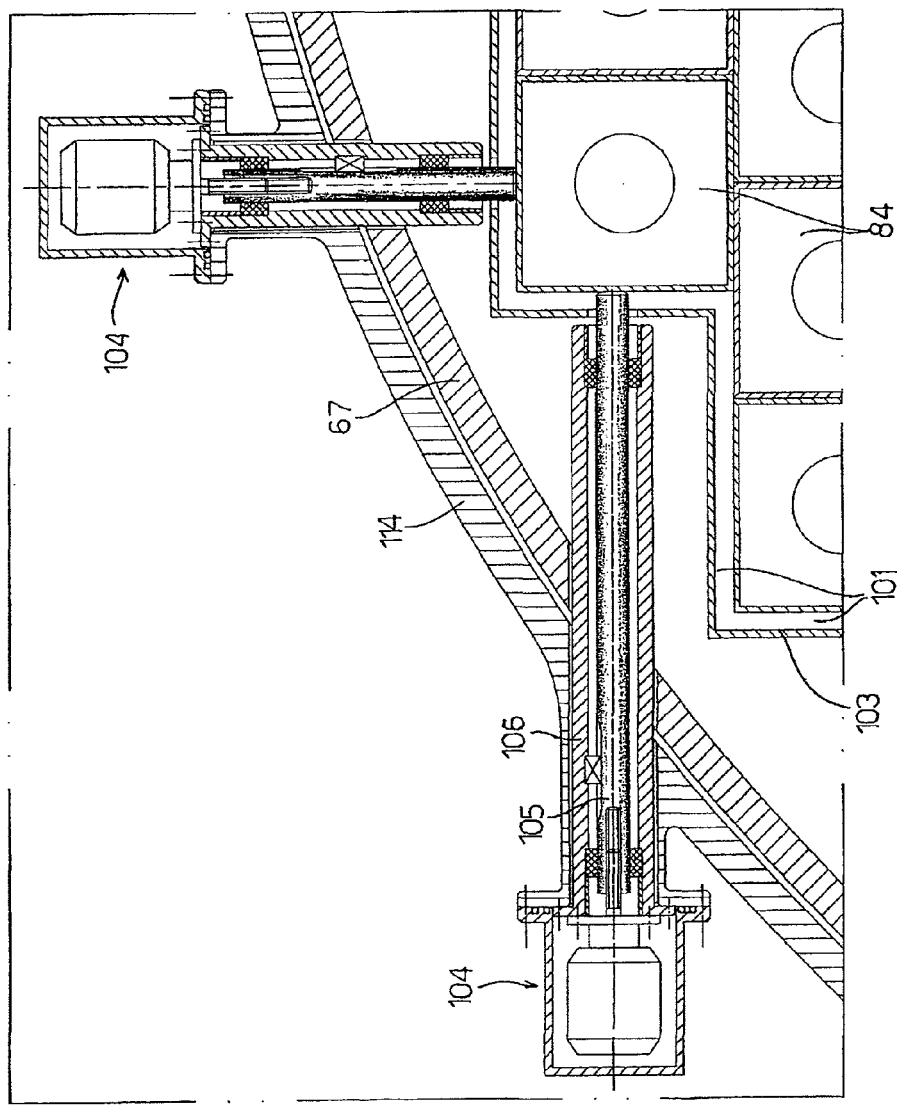
FIGS. 9-14 show further details at an enlarged scale of the reactor in accordance with the invention.
Figure 10:
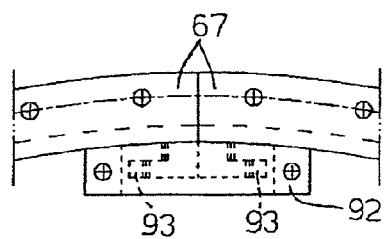
Figure 11:
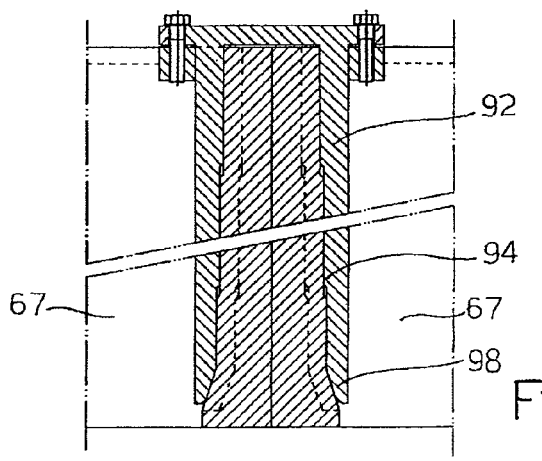

During normal operation of the reactor, the fuel elements 12 are kept in contact. The clearance necessary for handling the elements 12 can be provided in different ways. FIG. 9 shows clearances 101 envisaged in normal operation of the reactor between a step-like contour 103 fixed with respect to the sectors 67 of the structure 5 and the first (radially outer) ring of shielding elements 84 (peripheral elements 84). The solid mechanical connection can be restored, during normal operation, using contrast devices or elements 104. For example, motor-driven contrast devices 104 are used, which are fixed with respect to the portion 114 and traverse it in a sealed way and engage on external faces of the peripheral elements 84. During refueling, the clearance may be re-established by releasing a contrast rod 105, which is able to slide in a supporting sleeve 106. The contrast rod 105 and the supporting sleeve 106 can be extracted from the outside to enable replacement of a sector 67.

Further contrast devices 108 (FIG. 2) can be provided for binding the sectors 67 to the tubular portion 114 radially.

The contrast devices 104 can also be constituted by eccentric cams (not represented), which act at different levels via a shaft actuated at the level of the head of the peripheral (radially external) shielding elements 84. By actuating the eccentric cams it is possible to calibrate the clearance between the peripheral elements 84 and the sectors 67 of the structure 5. The clearance between the peripheral elements 84 and the sectors 67 of the structure 5 can also be calibrated via a vertical movement of the peripheral elements 84 themselves provided with one or more wedge-shaped parts (not represented). In this case, the peripheral elements will, for example, have the possibility of enabling a certain vertical sliding with respect to the supporting beam 55 via devices (not represented) actuated by the refueling machine.

The shielding elements 84 of the external ring carry elastic foils 78, possibly set on a number of levels along the axis A, which project laterally in cantilever fashion to come into contact with the contour 103. When the contrast rods are released and the elements 84 are in contact with the contour 103, the foils 78 are completely housed in respective seats 109 so as to fit back into the vertical projections of the elements 12 and so as not to project laterally from the structures 33. When, during normal operation of the reactor, the elements 84 are set at a distance from the contour 103, the foils 78 extend elastically in a direction perpendicular to the axes A so as to block any vertical movement of gas or primary fluid F within the gap 101.

As is shown in FIG. 2, the elements 84 can moreover be used for housing auxiliary devices, for example, ones defining a treatment system 50 for cooling and purification of the gas G.

In particular, some elements 84 incorporate, in the top part set out of the primary fluid F, circulation devices (blowers) 85, heat exchangers 86 and/or filtering devices 87, which operate on the gas G and are hydraulically connected to the stratified spaces 36. The system 50 enables along the elements 12 and the elements 84 a thermal gradient to be set up between the hot bottom part immersed in the primary fluid F and the cold top part set at the bottom of the closing structure 3b, which is cold.

As is shown in FIG. 2, during refueling, the active part 13 of an element 12 being removed from the reactor 1 (illustrated partially raised with respect to the remaining elements 12), with the bundle of bars 16 open at the top, at the bottom, and at the sides, temporarily comes to constitute a branch of a circuit 100 for circulation of the gas G in parallel to the exchangers 86. The gas G that flows between the bars 16 cools the element 12 before its complete extraction and subsequent insertion in a cold conveying container 99 (FIG. 1).

If, instead, the element 12 is being inserted in the reactor 1 with fresh fuel, the circuit 100, especially in the hotter bottom portion, can be used as pre-heating circuit, by possibly momentarily stopping some exchangers 86.

The circuit 100 is defined by the spaces 36 and by selected elements 84; it is possible to connect the circuit 100 with one or more ducts 102 (possibly containing filters and/or blowers and/or heat exchangers), which send the gas G back into the cell 115 or into some other purposely provided chamber so as to create continuously a leakage flow (indicated by the small arrows 107 in FIG. 2) towards the elements 12. A duct 121 on the top of the head of the fuel element enables circulation of cooling gas during transfer of the fuel element towards the conveying container 99 where it may be cooled by other devices.

Figure 7:
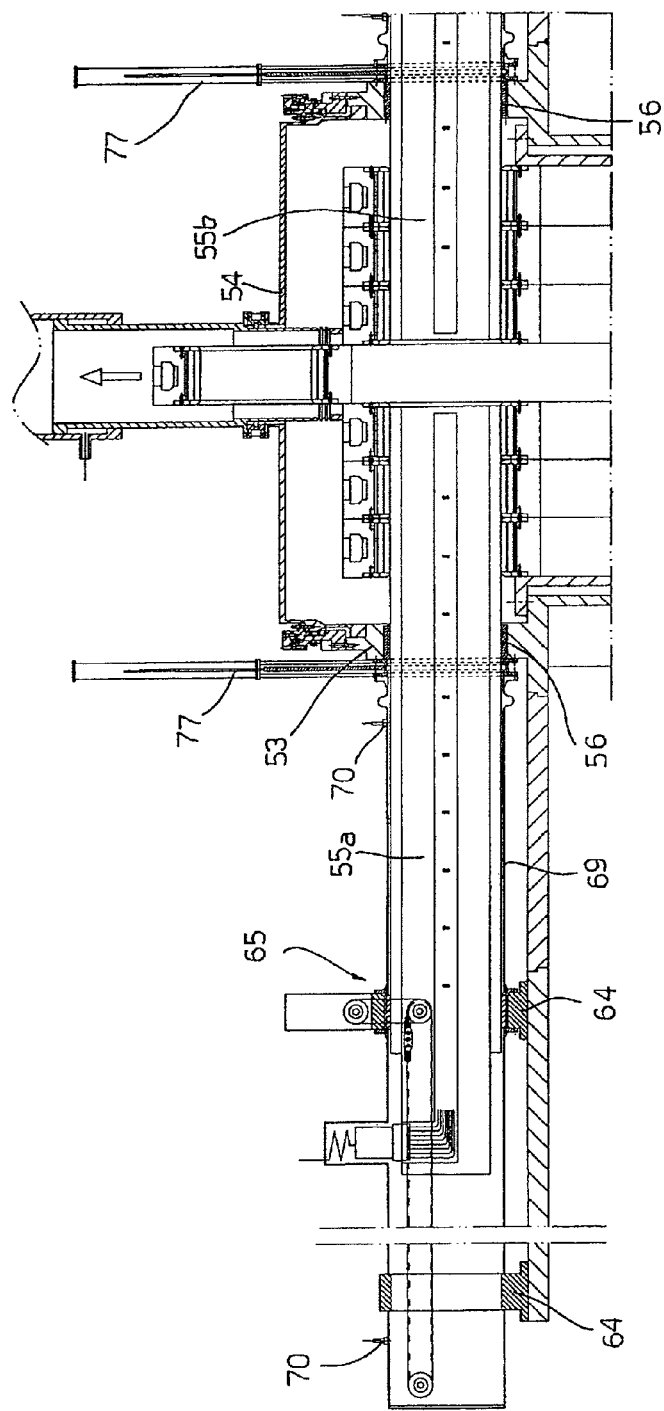

With reference to FIGS. 5-7, on both sides of the beams 55 longitudinal grooves 126 are made, running within which are the cables 80 that connect the sensors 127 installed on the elements 12 to the conductors outside the reactor (not represented in the figure). The cables 80 are protected with closing plates 128. On the external face of the plates 128, in a position corresponding to each element 12, a plane electrical contact 129 is inserted, electrically insulated with respect to the plate. The electrical contacts 129 are connected to the terminals of the cables 80. The opposite ends of the cables 80 come under terminals 130 that traverse in a sealed way the end sheath 69. During the operations that force sliding of the beams 55 the terminals 130 are disconnected.

Advantageously, each element 12 is constituted by two or more sections 96 coupled in succession along the axis A via releasable couplings 97 in such a way that the individual sections 96 are separable from one another for recovery and reuse or disposal. For example, the element 12 comprises a bottom cross section 96a, which contains the active part 13 and is to be sent to a plant for reprocessing of the fuel, an intermediate section 96b not reusable, and a top section 96c, which contains the mechanism 37 and the instrumentation for control of the core 4 and is reusable for providing new elements 12.

Safety ducts 88, installed at the top of the functional components 8 (in particular, of the primary heat exchangers), connect the space occupied by the covering gas G in the tank 2 with the cell 115 and are internally provided with controlled-failure diaphragms, which fail following upon overpressures determined, for example, by the failure of tubes of a heat exchanger.

With reference to FIGS. 1 and 8, the normal maintenance operations on the functional components 8 installed in the cold manifold 7 are performed from the service room 116 set above the roof 110. The replacement of the functional components 8 is possible using handling means 90 installed in the cell 115 after prior opening of the corresponding trapdoor 119, set above the functional component 8 in the cell 115.

It is possible to constitute temporarily a space 91, isolated in a sealed way, for extension of the cell 115, which contains the top heads of the functional components 8. For said purpose isolation structures 95 are inserted, which co-operate with the roof 110, the cell 115, and the portion 114 for delimiting the space 91.

From what has been set forth the advantages of the present invention emerge clearly.

The grid for supporting the core, which is a mechanically critical component, is eliminated.

The supporting structure of the fuel elements is positioned in cold gas, is perfectly visible, and is readily reachable with mechanical arms.

When the primary fluid is a heavy liquid metal, the fuel element is practically supported by the primary fluid itself, and the supporting structure has above all a positioning function, without being significantly loaded.

The hydraulic separation structure 5 between the hot manifold and the cold manifold can be replaced without having to remove the fuel elements.

The combined adoption of the plant solution of pumps and heat exchangers in the cold manifold as emerges from the patent application No. MI2007A001685 dated Aug. 22, 2007 entitled "Nuclear reactor, in particular nuclear reactor cooled with liquid metal, with compact primary heat exchanger" enables, when necessary, replacement of any component installed inside the reactor.

The number of shielding elements 84 set between the active part of the core and the hydraulic-separation structure between the hot manifold and the cold manifold can be reduced.

All machines for handling the fuel immersed in the primary fluid are eliminated.

The instrumentation for control of the core does not require additional supporting structures immersed in the primary fluid, but can be directly installed on the fuel elements.

The absorbers 38, 39 for control of the nuclear reaction can be directly housed and moved within the fuel element, positioned in such a way as to not occupy spaces necessary for the fuel bars and distributed in the core in such a way as to render the distribution of the neutron flow as uniform as possible.

The fuel bar is shorter because it does not require any space for gas expansion.

The loss of head of the core is reduced because the fuel bars are shorter with consequent reduction in the pumping power of the pumps and consequent improvement in the operation in natural circulation.

The height of the reactor tank is reduced as a result of reduction of the overall dimensions of the fuel element underneath the active part.

The thickness of the fuel sheath can be reduced on account of the absence of significant pressurization of the bars, which can be constantly kept at an internal pressure close to the pressure of the external coolant.

In the case of failure of a bar, which can be detected from an increase in activation of the primary coolant of the reactor, it is possible to identify the element to which it belongs via pressurization in sequence of the individual elements.

It is possible at any moment, both with the reactor in operation and with the reactor arrested, to carry out tests on the pressure of the fuel elements, even individually, pressurizing them via the ducts for collection of fission gases.

It is possible, before refueling, to extract by depressurization the residual fission gases that have come out of the pellets and replace them with clean gas.

It is possible to cool the fuel element taken out of the primary refrigerating fluid, before its transfer into the cell on top of the reactor.

It is possible to heat the fresh fuel element keeping it above the free surface of the primary refrigerating fluid, before immersion in the fluid itself.

The top part of the fuel element containing the mechanisms is not very activated and may be reused.

The fuel element and the control bars are supported by the same structure, and hence cases of triggering of reactivity on account of relative movement resulting, for example, in the case of an earthquake are ruled out.

During normal operation of the reactor, the core is perfectly encircled.

The possibility of performing horizontal displacements of the fuel element rules out the possibility of blockage during handling.

The reduced number of components reduces the amount of resources required for carrying out servicing inspections.

The modularity of the components facilitates their replacement.

Finally, it is understood that numerous modifications and variations may be made to the reactor described and illustrated herein, without thereby departing from the scope of the annexed claims.

The invention claimed is:

1. A nuclear reactor, in particular a pool-type nuclear reactor, having a main tank that houses a core, comprising:
    a bundle of fuel elements and immersed in a primary fluid circulating between the core; and
    at least one heat exchanger, wherein:
        the bundle of fuel elements extends along respective parallel longitudinal axes and have respective bottom ends immersed in the primary fluid to constitute the core, and
        the bundle of fuel elements include respective service sections, the respective service sections upwardly extending from the respective bottom ends and emerge from the primary fluid.

2. The reactor according to claim 1, wherein the fuel elements are mechanically supported by respective top end heads anchored to a supporting structure of the core.

3. The reactor according to claim 2, wherein the fuel elements hang superiorly from beams of the supporting structure and extend downwards from the beams.

4. The reactor according to claim 3, wherein each beam supports a row of fuel elements which it engages through respective slots, provided with sliding blocks and roller tracks and formed in the heads of the fuel elements.

5. The reactor according to claim 3, wherein the beams are longitudinally slidable by actuators provided with a chain-drive system.

6. The reactor according to claim 5, wherein the supporting structure comprises a first set of beams, which support the fuel elements during normal operation of the reactor, and a second set of beams, which are arranged aligned to respective beams of the first set and intervene one at a time to support in cantilever fashion the fuel elements disengaged from the corresponding beam of the first set when the latter is made to slide outwards to release a fuel element to be replaced.

7. The reactor according to claim 2, wherein the supporting structure is housed within a closing structure that closes superiorly the tank.

8. The reactor according to claim 7, wherein the supporting structure comprises beams arranged through openings made in a lateral wall of the closing structure.

9. The reactor according to claim 7, wherein the closing structure is a multi-level structure comprising a substantially annular bottom structure, set above the tank, an intermediate structure, which extends upwards from the bottom structure, and a central top structure, which closes above the intermediate structure; the supporting structure of the core being positioned above the tank and below the top structure.

10. The reactor according to claim 9, wherein the fuel elements are housed through an opening of the bottom structure, and the top end heads are accessible by handling machines housed in a cell set above the top structure after prior opening of further openings formed on the top structure.

11. The reactor according to claim 10, further comprising safety ducts, installed on respective tops of functional components, which connect a space occupied by covering gas in the tank with the cell and are internally provided with controlled-failure diaphragms, which fail following upon pre-set overpressures.

12. The reactor according to claim 10, wherein the closing structure comprises a roof, which closes the tank, and a top closing element, which substantially face one another and have respective central openings; and a first tubular superelevation portion, which connects the openings, and a second tubular superelevation portion, which extends from the top closing element, said portions housing the fuel elements; the roof being provided with windows for housing functional components of the reactor and the closing element having trapdoors aligned to respective windows.

13. The reactor according to claim 12, wherein a region outside and substantially around the first tubular superelevation portion defines a service room, which is separate from the cell and set in which are respective top heads of the functional components and provided with mobile insulation structures for temporary constitution of a sealed isolated space containing the top heads of the functional components.

14. The reactor according to claim 12, wherein the beams, from which the fuel elements hang, are positioned through openings made in the second superelevation portion and rest on supports.

15. The reactor according to claim 1, wherein the fuel elements are arranged in parallel rows and are mobile in a direction perpendicular to the axes along the rows and, limitedly to the recovery of pre-set gaps, also in a direction transverse to the rows.

16. The reactor according to claim 1, further comprising a substantially tubular separation structure that separates a hot manifold overlying the core from a cold manifold surrounding the hot manifold and radially outer with respect thereto; the separation structure enveloping the bundle of fuel elements for defining at the same time a fuel elements containment structure.

17. The reactor according to claim 16, wherein the separation structure one of:
    is constituted by a single monolithic piece; and
    comprises a plurality of sectors set alongside one another circumferentially and separable from one another to be replaced without removal of the fuel elements.

18. The reactor according to claim 17, wherein in normal operation of the reactor the sectors of the structure are constrained radially by contrast devices co-operating with a tubular superelevation portion of the closing structure that houses the heads of the fuel elements.

19. The reactor according to claim 1, wherein the bundle of fuel elements is surrounded by one or more rings of shielding elements, which are set radially outwards around the bundle of fuel elements.

20. The reactor according to claim 19, further comprising adjustable contrast devices, acting on a radially outer ring of peripheral shielding elements for gripping said elements radially.

21. The reactor according to claim 19, wherein the shielding elements are enclosed by a basically tubular separation structure.

22. The reactor according to claim 21, wherein during normal operation of the reactor the outermost peripheral shielding elements are separated from the separation structure by a gap which, during refueling operations, is shared between the fuel elements of the rows that come under the aforesaid shielding elements, reducing mutual constriction thereof and, consequently, the force of extraction of the fuel elements belonging to those rows.

23. The reactor according to claim 19, wherein, in normal operation of the reactor, the peripheral shielding elements are held grouped together by contrast devices which interact between the shielding elements and a tubular superelevation portion of the closing structure that houses the heads of the fuel elements.

24. The reactor according to claim 19, wherein, in normal operation of the reactor, the radially external peripheral shielding elements are kept grouped together at the bottom by contrast elements having the shape of one of an eccentric cam or wedge, co-operating with a contour structure that surrounds the shielding elements.

25. The reactor according to claim 19, wherein the shielding elements carry, on a number of levels, elastic foils, set along the axis, which with the gap open project laterally to contact a radially internal contact contour of the separation structure, and with the gap closed are completely housed in respective seats of the shielding elements.

26. The reactor according to claim 19, wherein the shielding elements have a general shape substantially similar to that of the fuel elements, and some shielding elements house, in respective top parts, auxiliary gas flows treatment devices.

27. The reactor according to claim 1, wherein the core comprises nuclear reaction control absorbers, which are axially slidably inserted within the fuel elements and are directly moved by actuation mechanisms positioned within the fuel elements.

28. The reactor according to claim 27, wherein the fuel elements comprise absorbers, provided with respective absorbent parts which are positioned at least one of above the respective bottom ends and through the respective bottom ends, and are movable to be selectively introduced into the core and extracted from the core, the respective absorbent parts one of sliding within respective central tubes of the fuel elements to position themselves above the core, sliding within respective conduits to position the respective absorbent parts inside the core.

29. The reactor according to claim 27, wherein the absorbers are brought into a position of intervention by one of: gravitational thrust of masses of material following de-energization of anchorage electromagnets, and a motor-driven internal screw-external screw coupling.

30. The reactor according to claim 1, wherein the fuel elements comprise a conduit, which extends underneath each respective bottom end and inside which are positioned absorbers, provided with an absorbent part positioned underneath each respective bottom end for being selectively introduced into the core and extracted from the core, sliding within the conduit to position the absorbent part inside the core.

31. The reactor according to claim 30, wherein the absorbers are brought into a position of intervention by one of: hydrostatic thrust of primary fluid following de-energization of anchorage electromagnets, and a motor-driven internal screw-external screw coupling.

32. The reactor according to claim 1, wherein the instrumentation for control of the core is directly installed on the fuel elements.

33. The reactor according to claim 32, wherein the cables of the instrumentation for control of the core are set along the fuel elements up to the respective top end heads, and are connected electrically to conductors installed on the supporting structure via electrical sliding contacts for accompanying displacements of the supporting structure and of the fuel elements.

34. The reactor according to claim 1, wherein each respective bottom end of each fuel element comprises a bundle of bars set alongside one another, having internal compartments containing fissile material; the compartments being connected, via ducts for evacuation of fission gases, to an expansion space, and via a further duct that ascends the entire fuel element, to a valve that can be connected, at the level of the head of the element, to an emptying and pressure-control system.

35. The reactor according to claim 1, wherein the service section of each fuel element comprises a central tube, set along the axis, and a perimetric structure with a polygonal cross section set around the central tube; the structure having a series of one of local interruptions or restrictions along the axis, defined by respective cross section variations to constitute respective free zones; side-by-side zones of the fuel elements communicating with one another to form free lattice spaces arranged in horizontal layers.

36. The reactor according to claim 35, wherein the fuel elements have first bottom zones set immediately above the respective bottom ends and constituting a space of hydraulic connection between the outlet of the primary fluid from the core and delivery ducts connected to primary fluid circulation pumps.

37. The reactor according to claim 35, wherein the fuel elements have at least one of:
  zones arranged at a free surface of the primary fluid in the tank; and
  zones spaced apart from one another along the axis above the free surface of the primary fluid and occupied by gas, which define stratified gas spaces for communication between the elements.

38. The reactor according to claim 1, wherein the bundle of fuel elements is provided with a gas-treatment system, comprising a plurality of stratified spaces defined at the pre-set levels along the fuel elements and in which a gas circulates, and circulation, heat exchangers, and/or filtering devices, which operate on the gas and are hydraulically connected to the stratified spaces and housed in respective top parts of shielding elements set around the bundle of fuel elements.

39. The reactor according to claim 1, wherein each fuel element is constituted by two or more sections coupled in succession along the axis via releasable couplings in such a way that the sections are separable from one another for recovery and reuse or disposal of the individual sections.

* * * * *